US011459213B2

United States Patent
Brice et al.

(10) Patent No.: US 11,459,213 B2
(45) Date of Patent: Oct. 4, 2022

(54) LIFTING TOOL FOR LIFTING A WIND TURBINE BLADE, LIFTING ARRANGEMENT, WIND TURBINE INSTALLATION ENVIRONMENT AND METHOD FOR ASSEMBLING A WIND TURBINE BLADE WITH A HUB OF A WIND TURBINE

(71) Applicant: Siemens Gamesa Renewable Energy A/S, Brande (DK)

(72) Inventors: Russell James Brice, Daugard (DK); Jesper Moeller, Brande (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/019,772

(22) Filed: Sep. 14, 2020

(65) Prior Publication Data
US 2021/0078836 A1    Mar. 18, 2021

(30) Foreign Application Priority Data

Sep. 16, 2019  (EP) .................................. 19197437

(51) Int. Cl.
*B66C 1/10*        (2006.01)
*F03D 13/10*       (2016.01)
*B66C 23/18*       (2006.01)

(52) U.S. Cl.
CPC ............ *B66C 1/108* (2013.01); *B66C 23/185* (2013.01); *F03D 13/10* (2016.05); *F05D 2230/68* (2013.01)

(58) Field of Classification Search
CPC ....... B66C 1/108; B66C 23/185; B66C 13/08; F03D 13/10; F03D 1/0658; F03D 80/00; F05D 2230/68; F05D 2230/61
See application file for complete search history.

(56) References Cited

U.S. PATENT DOCUMENTS

2015/0330364 A1    11/2015  Liu et al.
2018/0257914 A1 *   9/2018  Franke .................... B66C 1/108
(Continued)

FOREIGN PATENT DOCUMENTS

CN    110228752 A      9/2019
EP     2873641 A1 *    5/2015  ............... B66C 1/62
(Continued)

OTHER PUBLICATIONS

Taiwanese Office Action for Application No. 109131662, dated Apr. 22, 2021.

*Primary Examiner* — Moshe Wilensky
(74) *Attorney, Agent, or Firm* — Schmeiser, Olsen & Watts LLP

(57) ABSTRACT

Provided is a lifting tool for lifting a wind turbine blade by means of a crane for subsequent assembly with a wind turbine, the lifting tool having at least one attachment means for attachment to the crane and at least one holding device for holding the wind turbine blade, whereby the at least one holding device is connected to a controller of the lifting tool and the holding device includes at least one movable supporting element for supporting the wind turbine blade and at least one actuator connected to the at least one movable supporting element and controlled by the controller so that the movable supporting element is movable by means of the actuator. Further provided is a lifting arrangement, a wind turbine installation environment and a method for assembling a wind turbine blade with a hub of a wind turbine.

16 Claims, 3 Drawing Sheets

(56) References Cited

U.S. PATENT DOCUMENTS

2018/0362306 A1* 12/2018 Lopez-Benedito ... F03D 1/0658
2021/0284506 A1* 9/2021 Moeller .................. B66C 23/52

FOREIGN PATENT DOCUMENTS

| WO | 2017108053 A1 | 6/2017 |
| WO | 2019120414 A1 | 6/2019 |

* cited by examiner

LIFTING TOOL FOR LIFTING A WIND TURBINE BLADE, LIFTING ARRANGEMENT, WIND TURBINE INSTALLATION ENVIRONMENT AND METHOD FOR ASSEMBLING A WIND TURBINE BLADE WITH A HUB OF A WIND TURBINE

CROSS-REFERENCE TO RELATED APPLICATIONS

This application claims priority to EP Application No. 19197437.7, having a filing date of Sep. 16, 2019, the entire contents of which are hereby incorporated by reference.

FIELD OF TECHNOLOGY

The following relates to a lifting tool for lifting a wind turbine blade, a lifting arrangement, a wind turbine installation environment and a method for assembling a wind turbine blade with a hub of a wind turbine.

BACKGROUND

A particular challenge in offshore installation or service of a wind turbine arises when either a floating wind turbine foundation is used for the wind turbine to be installed or serviced or a crane vessel is used to lift the wind turbine blade to be assembled with the wind turbine. This assembly takes place when initially installing the wind turbine or when replacing or servicing wind turbine blades. Due to the floating of the wind turbine foundation and/or the crane vessel, the wind turbine and/or the crane are subjected to motions, which make it difficult to position the wind turbine blade at a position of the hub of the wind turbine for assembly therewith. Hence, significant structural reinforcements of the wind turbine blades are required to ensure that the wind turbine blades do not become damaged upon accidental collision or contact under high load with the hub due to the motions induced by the floating.

SUMMARY

An aspect relates to eliminate or at least reduce disadvantages in the prior art techniques related to the assembly of wind turbine blades with a wind turbine, in particular to provide a lifting tool for lifting a wind turbine blade, which enables safe and quick assembly of the wind turbine blade with the wind turbine.

According to a first aspect of embodiments of the invention, disadvantages are avoided by means of a lifting tool for lifting a wind turbine blade by means of a crane for subsequent assembly with a wind turbine, the lifting tool having at least one attachment means for attachment to the crane and at least one holding device for holding the wind turbine blade, whereby the at least one holding device is connected to a controller of the lifting tool and the holding device comprises at least one movable supporting element for supporting the wind turbine blade and at least one actuator connected to the at least one movable supporting element and controlled by the controller so that the movable supporting element is movable by means of the actuator. In particular, the wind turbine blade is assembled with a hub of the wind turbine.

By means of the lifting tool of embodiments of the invention, when moving the at least one supporting element, the wind turbine blade is moved or positioned from one holding position to another holding position. The movement can be controlled by the controller so that an unpredictable motion of the lifting tool or the hub of the wind turbine, which may be induced by a floating of the crane vessel of the crane or a floating of a floating wind turbine foundation of the wind turbine, is being compensated for. Thereby, it can be prevented, that the hub of the wind turbine and the wind turbine blade collide or contact each other under high load. By means of using the lifting tool of embodiments of the invention, the wind turbine blade can be lifted and positioned at the position of assembly at the hub of the wind turbine with high accuracy and no risk of detrimental collisions or high load transfers. Thereby, the safety of the assembly process can be increased and the assembly time can be reduced. Further, structural reinforcements previously provided to reduce risk of damage during assembly can be reduced or omitted.

The lifting tool is configured for being lifted by the crane. The wind turbine blade is being held in the lifting tool while the crane lifts the lifting tool. After the lifting tool and thereby the wind turbine blade has been positioned by means of the crane at the position of assembly at the hub of the wind turbine, the wind turbine blade may be fixed to the hub and the wind turbine blade released from the lifting tool.

The at least one actuator may be controlled electrically or hydraulically, for example. The actuator may be a piston or motor, for example. When there is more than one actuator, different types of actuators may be used. The actuator may also be referred to as an active motion compensation means as it compensates for the floating induced motion of the lifting tool or the wind turbine by moving or positioning the wind turbine blade held within the lifting tool.

The attachment means for attachment to the crane may be an eyelet, for example. The attachment means may be configured for attachment to a crane hook or crane rope of the crane, for example.

The controller is configured to control movement of the at least one movable supporting element of the at least one holding device by means of the at least one actuator. In particular, the at least one holding device may comprise multiple movable supporting elements. Each of the multiple movable supporting elements may be movable by means of a separate actuator. The movement of the movable supporting element may be a translational and/or rotational movement.

In an embodiment, at least one of the at least one movable supporting element comprises a concave supporting surface. The concave supporting surface of the movable supporting element may in particularly correspond in shape to at least a portion of the wind turbine blade. The concave supporting surface may be slip-resistant, for example. Thereby, a safe and low in tension holding of the wind turbine blade in the lifting tool can be achieved.

Moreover, in an embodiment, at least one of the at least one movable supporting element is connected to a frame of the lifting tool by means of an extendable arm. In particular, the extendable arm is extendable along a height axis of the wind turbine, i.e. perpendicular or substantially perpendicular to the ground. For this purpose, the extendable arm may also comprise an actuator, which may be controlled by the controller. By means of extending the extendable arm, the movable supporting element may be easily brought into contact with the wind turbine blade upon receiving the wind turbine blade by the lifting tool. In addition, by means of retracting the extendable arm, the wind turbine blade may be easily released from the lifting tool after successful assembly of the wind turbine blade with the hub of the wind turbine.

Also, in an embodiment, at least one further movable supporting element is connected to the frame opposite of the at least one movable supporting element connected to the frame by means of the extendable arm, whereby the movable supporting elements form a clamp for clamping the wind turbine blade. Thereby, a particularly safe holding of the wind turbine blade is achievable while compensating motions.

Further, in an embodiment, at least one of the at least one movable supporting element is rotatable. In particular, the movable supporting element may be rotatable around a longitudinal axis of the wind turbine blade. Moreover, the rotatable movable supporting element may be a movable supporting element connected to the frame of the lifting tool by means of the extendable arm. The rotatable movable supporting element and extendable arm may form together a part of a clamp. Thereby, an active compensation of induced motion in directions transverse to a height direction along the height axis of the wind turbine can be provided.

In an embodiment, at least one of the at least one movable supporting element is a glider shoe being movable in gliding directions, whereby the gliding directions run transverse to a longitudinal axis of the wind turbine blade and a height axis of the wind turbine. The glider shoe may be supported glidingly within a groove of the lifting tool or on a rail of the lifting tool, for example. The glider shoe may comprise rollers and locking means for locking the glider shoe at a certain position. The glider shoes further may be height-adjustable and/or rotatable, whereby a further possibility of moving or positioning the wind turbine blade is added. The wind turbine blade may be supported on the glider shoe and easily be moved and oriented towards and away from the wind turbine, in particular its hub.

In an embodiment, the at least one holding device comprises two glider shoes arranged next to each other in the gliding directions, whereby the two glider shoes are movable towards and apart from each other. By adjusting a distance between the glider shoes, different sizes of wind turbine blades may be safely and with as little as possible tension supported on the glider shoes and thereby held by the same lifting tool.

Moreover, in an embodiment, two holding devices of the at least one holding device are arranged at a distance from one another in a direction along a longitudinal axis of the wind turbine blade. The distance may be in the range of 5 to 40 meters, in particular 10 to 30 meters, for example. The holding devices may have the same configuration. In particular, the holding devices may be controlled synchronously by the controller. Thereby, a further possibility of displacement is added. Thereby, a very safe and low in tension holding of the wind turbine blade in the lifting tool may be provided.

In an embodiment, the lifting tool comprises a lifting tool sensor connected to the controller, whereby the lifting tool sensor is configured to detect a relative distance or position of the lifting tool with respect to the wind turbine. The lifting tool sensor may be any sensor suitable of measuring a position or distance from an object such as an inductive sensor, capacitive sensor, laser sensor, a camera device or the like. The detected relative position of the lifting tool with respect to the wind turbine or the detected relative distance of the lifting tool from the wind turbine may be used by the controller to control the at least one actuator such that the wind turbine blade is brought into the assembly position at the wind turbine, in particular the hub, without collision.

Further, in an embodiment, the controller is arranged to control the at least one actuator by means of a function of at least the relative distance or position. For example, when a crane vessel and a fixed-bottom foundation for the wind turbine are used as a lifting arrangement, the relative distance or position of the lifting tool with respect to the wind turbine, in particular an assembly position of the wind turbine blade at the hub, can easily be determined and motions induced by the floating of the crane vessel can be compensated for by the at least one actuator controlled by the controller.

According to a second aspect of embodiments of the invention, disadvantages are avoided by means of a lifting arrangement comprising the lifting tool of embodiments of the invention and the crane, whereby the lifting tool is attached to the crane. The crane may be supported on a crane vessel.

According to a third aspect of embodiments of the invention, disadvantages are avoided by means of a wind turbine installation environment comprising the lifting tool of embodiments of the invention and a wind turbine, whereby the wind turbine comprises a wind turbine sensor configured to interact with the lifting tool sensor to detect the relative distance or position. Thereby, relative movements between the lifting tool sensor and wind turbine sensor can be detected with high precision and compensated for by means of the controller. The controller of the lifting tool may be connected or integrated with other controllers such as controllers of the wind turbine and/or the crane. The wind turbine may have a fixed-bottom foundation having a monopile, tri-pod, jacket, suction caisson or gravity base or have a floating foundation such as known from the state of the art.

According to a fourth aspect of embodiments of the invention, disadvantages are avoided by means of a method for assembling a wind turbine blade with a hub of a wind turbine having the steps of: (a) positioning the wind turbine blade in a lifting tool according to embodiments of the invention, (b) attaching the lifting tool to a crane, and (c) lifting the wind turbine blade by means of the crane and positioning it towards the hub, whereby the at least one movable supporting element is controlled by means of the controller, so that the wind turbine blade is brought into contact with the hub, in particular an assembly position at the hub.

In particular, the controller may be configured to move the at least one movable supporting element in permanent reaction to motions influencing the lifting and positioning of the wind turbine blade. The motions may be induced by floating as previously described. The controller may be configured to permanently control the at least one movable supporting element so that detrimental collisions and high-load contacts are avoided.

BRIEF DESCRIPTION

Some of the embodiments will be described in detail, with reference to the following figures, wherein like designations denote like members, wherein.

Figure 1:
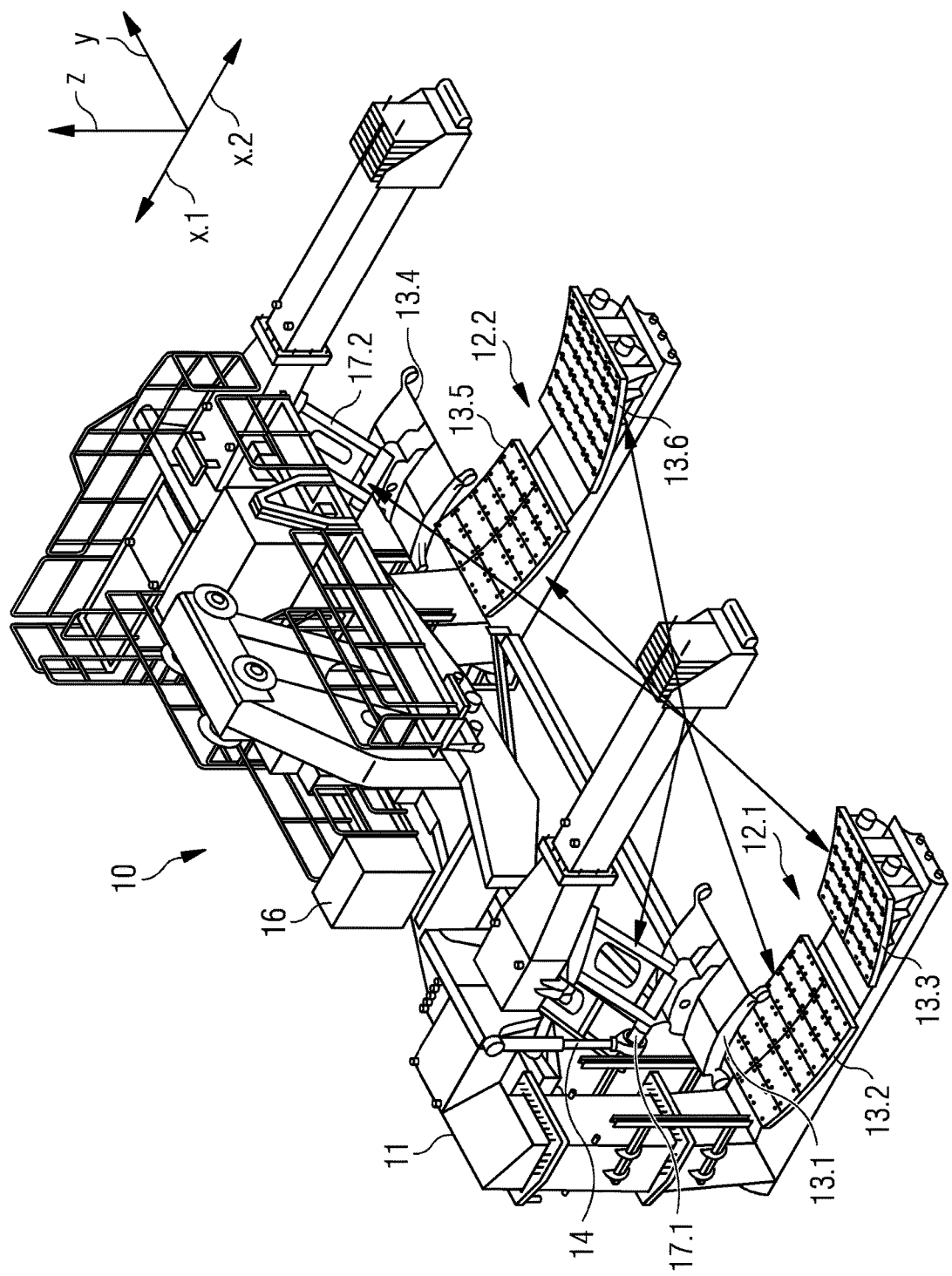
FIG. 1 shows a side perspective view on a lifting tool according to an embodiment of the invention.
Figure 2:
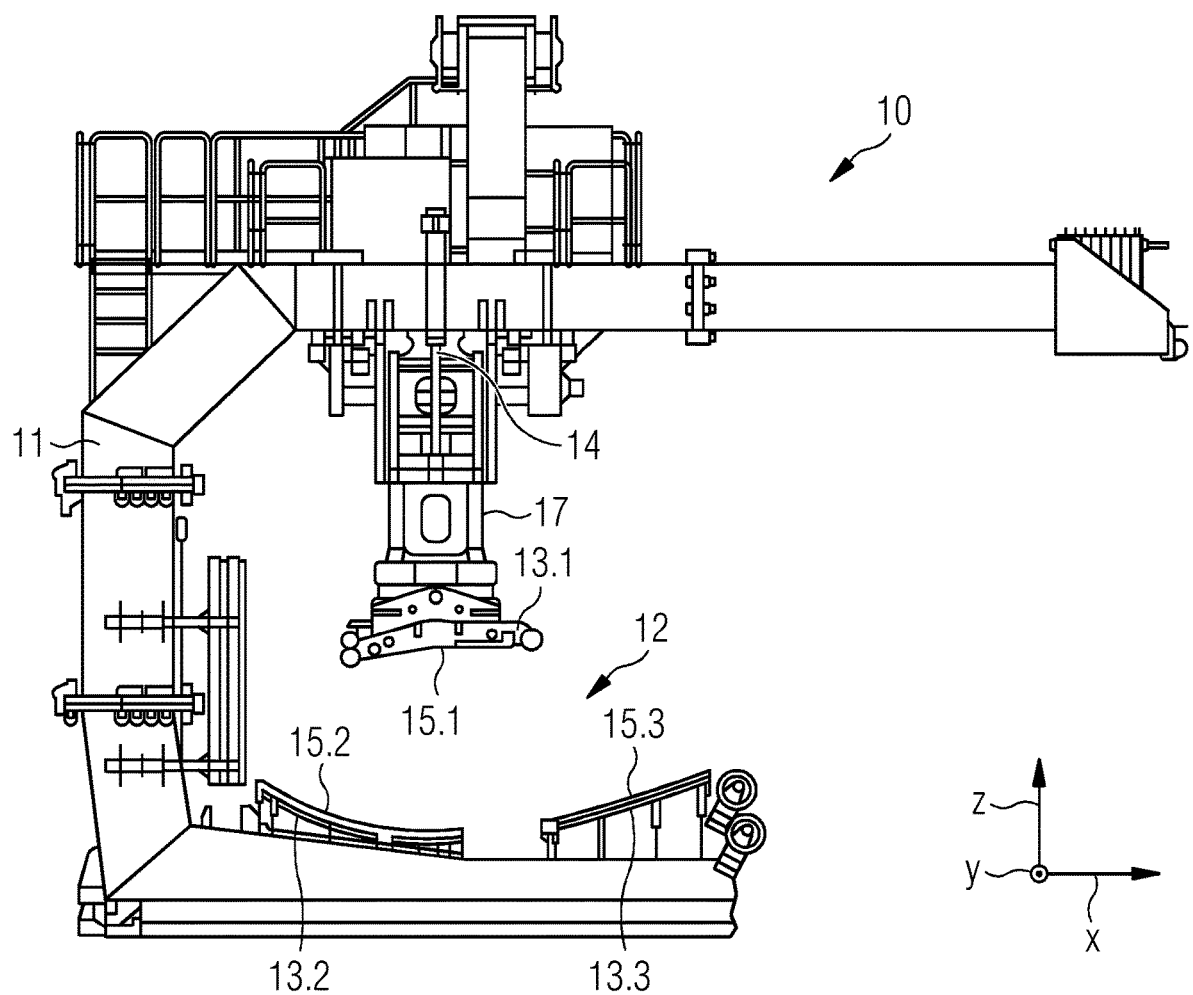
FIG. 2 shows a side view on the lifting tool of FIG. 1.
Figure 3:
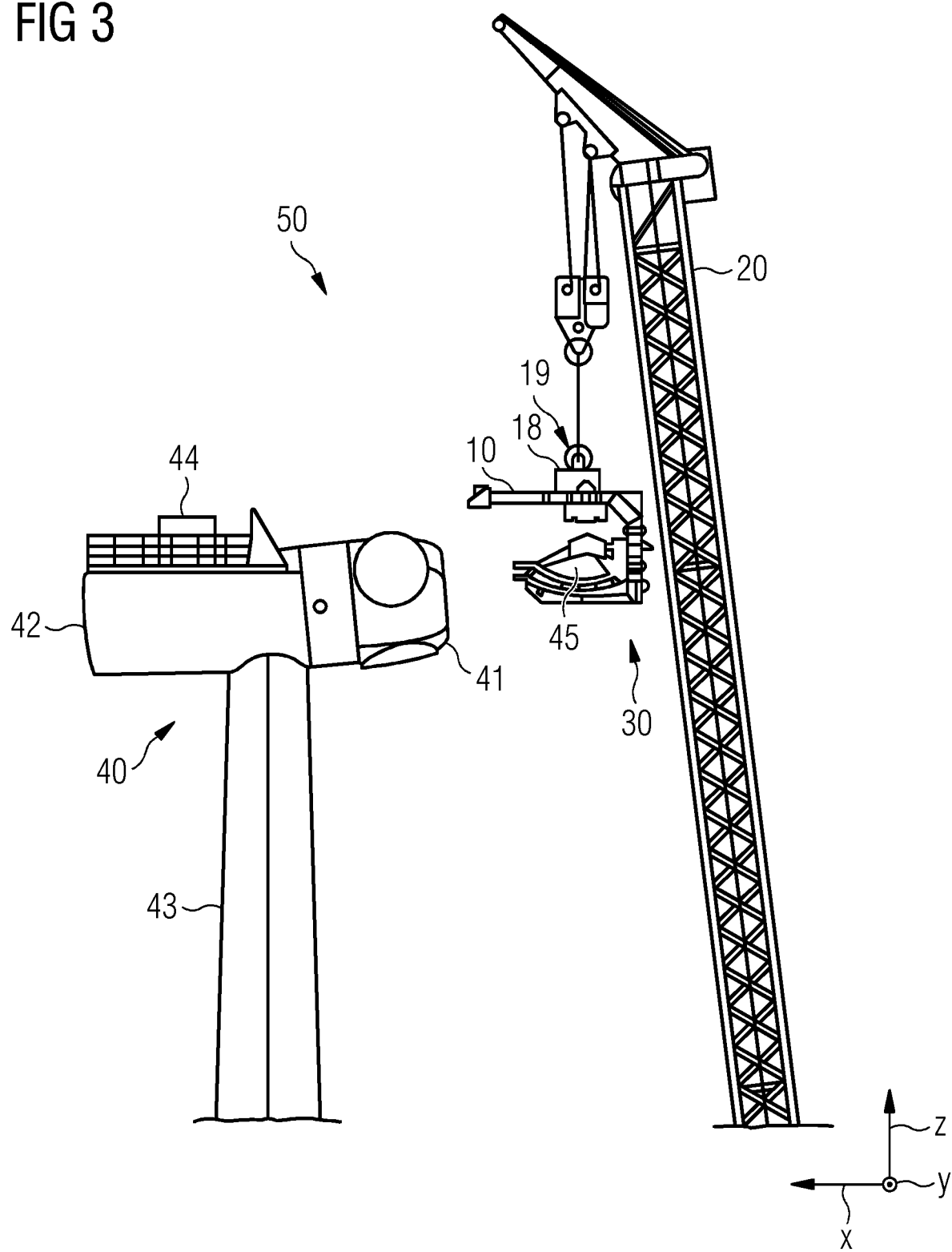
FIG. 3 shows a partial side view on a wind turbine installation environment according to an embodiment of the invention.

Same objects in FIGS. 1 to 3 are denominated with the same reference number. If there is more than one object of the same kind in one of the figures, the objects are numbered in ascending order with the ascending number of the object being separated from its reference number by a dot. The specific dimensions of features and parts in the figures are exemplary and may be enlarged for ease of reference only.

DETAILED DESCRIPTION

FIG. 1 shows a side perspective view on a lifting tool 10 according to an embodiment of the invention. The lifting tool 10 comprises two holding devices 12.1, 12.2 attached to a frame 11 of the lifting tool 10. The holding devices 12.1, 12.2 have same structures as will be further explained. However, they may alternatively have different structures. The holding devices 12.1, 12.2 are spaced apart from one another at a distance of 18 meters in this particular embodiment. The holding devices 12.1, 12.2 are spaced apart from one another in a direction along a longitudinal axis Y of the wind turbine blade 45 to be held in the lifting tool 10. For clarity purposes, the wind turbine blade 45 is not shown in FIG. 1. When the wind turbine blade 45 is held in the lifting tool 10, as shown in FIG. 3, the wind turbine blade 45 is held in the holding devices 12.1, 12.2 and positioned lengthwise along the longitudinal axis Y. In this particular embodiment, the longitudinal axis Y is also the longitudinal axis Y along the length of the lifting tool 10.

Since both holding devices 12.1, 12.2 have the same structure, they will be described in the following with reference to the holding device 12.1 only. The holding device 12.1 comprises three movable supporting elements 13.1, 13.2, 13.3. A first movable supporting element 13.1 is connected to an extendable arm 17.1. The extendable arm 17.1 is a scissor arm in this embodiment but may be of any other type such as a telescopic arm, for example. By means of the extendable arm 17.1, the first movable supporting element 13.1 may be adjusted in height along the height axis Z or in other words be extended and retracted. The height axis Z is an axis along the height of the wind turbine 40 as shown in FIG. 3. For this purpose, an actuator 14 in the type of a piston is attached to the extendable arm 17.1. The actuator 14 can be actuated by means of a controller 16 of the lifting tool 10. When the extendable arm 17.1 is extended by means of the actuator 14 controlled by the controller 16, the first movable supporting element 13.1 may clamp the wind turbine blade 45 in between the first movable supporting element 13.1 and second and third movable supporting elements 13.2, 13.3, when the wind turbine blade 45 is supported on the second and third movable supporting elements 13.2, 13.3. Thereby, the wind turbine blade 45 can be safely held in the lifting tool 10.

The second and third movable supporting elements 13.2, 13.3 are designed to support the weight of the wind turbine blade 45, which rests on them. The second and third movable supporting elements 13.2, 13.3 alternatively may be only one second movable supporting element. The second and third movable supporting elements 13.2, 13.3 in this embodiment are designed as glider shoes being movable in gliding directions X.1, X.2. The gliding directions X.1, X.2 run transverse to the longitudinal axis Y and the height axis Z. The two glider shoes are movable towards and apart from each other, so that they can be adjusted for different widths of wind turbine blades 45. In addition, the height of the first movable supporting element 13.1 is adjustable for different thicknesses of the wind turbine blades 45. Thereby, wind turbine blades 45 of different sizes can be held in the lifting tool 10 making it very versatile.

FIG. 2 shows a side view on the lifting tool 10 of FIG. 1. As can be clearly seen from this perspective, the movable supporting elements 13.1, 13.2, 13.3 are provided with supporting surfaces 15.1, 15.2, 15.3 having a concave shape to conform with the shape of the wind turbine blade 45 to be held in the lifting tool 10 without any damage. Further, it can be seen that the first movable supporting element 13.1 is rotatable around the longitudinal axis Y to provide further capabilities of displacing the wind turbine blade 45 for compensation of relative movements between the lifting tool 10 and the wind turbine 40 as shown in FIG. 3.

FIG. 3 shows a partial side view on a wind turbine installation environment 50. The wind turbine installation environment 50 comprises a wind turbine 40 and a lifting arrangement 30 comprising the lifting tool 10 of FIG. 2 attached by means of attachment means 19 to a crane 20. A wind turbine blade 45 is held in the lifting tool 10 for lifting it to the hub 41 of the wind turbine 40 and assembly therewith. The hub 41 of the wind turbine 40 is attached to a nacelle 42, which is supported on a mast 43. The crane 20 is supported on a crane vessel (not shown) and the wind turbine 40 is founded on a floating foundation (not shown). Thereby, the crane 20 and the wind turbine 40 are subjected to relative motions towards and apart from each other due to floating of the crane vessel and the floating foundation.

To prevent the lifting tool 10 from colliding with the hub 41 due to these unpredictable motions and ensure a quick assembly of the wind turbine blade 45 with the hub 41, the lifting tool 10 is provided with a lifting tool sensor 18 and the wind turbine 40 is provided with a wind turbine sensor 44, which is installed on top of the nacelle 42 in this particular embodiment. The lifting tool sensor 18 and the wind turbine sensor 44 detect relative distance or position of the lifting tool 10 with respect to the wind turbine 40. This relative distance or position is being communicated to the controller 16, which controls the actuators 14 of the lifting tool 10 so that the wind turbine blade 45 is moved by means of the movable supporting elements 13 in such a way, that collision is prevented but the wind turbine blade 45 is brought into correct position for assembly with the hub 41. Moreover, the controller 16 may be connected to a controller of the crane 20 so that also the crane 20 is controlled relative to the detected distances or positions.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A lifting tool for lifting a wind turbine blade by a crane for subsequent assembly with a wind turbine, the lifting tool having at least one attachment means for attachment to the crane and at least one holding device for holding the wind turbine blade, wherein the at least one holding device is connected to a controller of the lifting tool and the holding device comprises at least one movable supporting element for supporting the wind turbine blade and at least one actuator connected to the at least one movable supporting element and controlled by the controller so that the movable supporting element is movable by the actuator, wherein the at least one movable supporting element is a glider shoe being movable in gliding directions, wherein the gliding directions run transverse to a longitudinal axis of the wind turbine blade and a height axis of the wind turbine, wherein the at least one holding device comprises two glider shoes arranged next to each other in the gliding directions, and wherein the two glider shoes are movable towards and apart from each other, the lifting tool further having a lifting tool sensor connected to the controller, wherein the lifting tool sensor is configured to detect a relative distance or position of the lifting tool with respect to the wind turbine, and wherein the controller is configured to control the at least one actuator by a function of at least the relative distance or position to move the wind turbine blade to a correct position.

2. The lifting tool according to claim 1, wherein at least one of the at least one movable supporting element comprises a concave supporting surface.

3. The lifting tool according to claim 1, wherein at least one of the at least one movable supporting element is connected to a frame of the lifting tool by an extendable arm.

4. The lifting tool according to claim 3, wherein at least one further movable supporting element is connected to the frame opposite of the at least one movable supporting element connected to the frame by the extendable arm, wherein the movable supporting elements form a clamp for clamping the wind turbine blade.

5. The lifting tool according to claim 1, wherein at least one of the at least one movable supporting element is rotatable.

6. The lifting tool according to claim 1, wherein two holding devices of the at least one holding device are arranged at a distance from one another in a direction along a longitudinal axis of the wind turbine blade.

7. A lifting arrangement comprising the lifting tool according to claim 1 and the crane, wherein the lifting tool is attached to the crane.

8. A wind turbine installation environment comprising the lifting tool according to claim 1 and a wind turbine, wherein the wind turbine comprises a wind turbine sensor configured to interact with the lifting tool sensor to detect the relative distance or position.

9. A method for assembling a wind turbine blade with a hub of a wind turbine having the steps of:
    (a) positioning the wind turbine blade in the lifting tool according to claim 1,
    (b) attaching the lifting tool to a crane, and
    (c) lifting the wind turbine blade by the crane and positioning it towards the hub, wherein the at least one movable supporting element is controlled by the controller, so that the wind turbine blade is brought into contact with the hub.

10. The method according to claim 9, wherein the controller is configured to move the at least one movable supporting element in reaction to motions influencing the lifting and positioning of the wind turbine blade.

11. A lifting tool for lifting a wind turbine blade by means of a crane for subsequent assembly with a wind turbine, the lifting tool having at least one attachment means for attachment to the crane and at least one holding device for holding the wind turbine blade, wherein the at least one holding device is connected to a controller of the lifting tool and the holding device comprises at least one movable supporting element for supporting the wind turbine blade and at least one actuator connected to the at least one movable supporting element and controlled by the controller so that the movable supporting element is movable by means of the actuator, wherein at least one of the at least one movable supporting element is a glider shoe being movable in gliding directions, wherein the gliding directions run transverse to a longitudinal axis of the wind turbine blade and a height axis of the wind turbine, wherein the at least one holding device comprises two glider shoes arranged next to each other in the gliding directions, and wherein the two glider shoes are movable towards and apart from each other.

12. The lifting tool according to claim 11, wherein at least one of the at least one movable supporting element is connected to a frame of the lifting tool by means of an extendable arm, wherein at least one further movable supporting element is connected to the frame opposite of the at least one movable supporting element connected to the frame by means of the extendable arm, whereby the movable supporting elements form a clamp for clamping the wind turbine blade.

13. The lifting tool according to claim 11, wherein at least one of the at least one movable supporting element is rotatable.

14. The lifting tool according to claim 11, wherein two holding devices of the at least one holding device are arranged at a distance from one another in a direction along a longitudinal axis of the wind turbine blade.

15. The lifting tool according to claim 11, wherein the lifting tool comprises a lifting tool sensor connected to the controller, wherein the lifting tool sensor is configured to detect a relative distance or position of the lifting tool with respect to the wind turbine.

16. The lifting tool according to claim 15, wherein the controller is arranged to control the at least one actuator by means of a function of at least the relative distance or position to move the wind turbine blade to a correct position.

* * * * *